United States Patent [19]

van der Heem

[11] 4,144,081
[45] Mar. 13, 1979

[54] NITROCELLULOSE COATING COMPOSITION

[75] Inventor: Peter van der Heem, Perryville, Md.

[73] Assignee: J. M. Huber Corporation, Locust, N.J.

[21] Appl. No.: 852,759

[22] Filed: Nov. 18, 1977

Related U.S. Application Data

[63] Continuation of Ser. No. 710,086, Jul. 30, 1976, abandoned.

[51] Int. Cl.$^2$ ............................................... C08L 1/18
[52] U.S. Cl. ............................. 106/193 J; 106/15.05; 106/194; 106/195; 106/308 C; 252/7
[58] Field of Search ............... 106/195, 15 FP, 308 C, 106/193 J, 194; 252/7

[56] References Cited

U.S. PATENT DOCUMENTS

3,518,064  6/1970  Lewin .................................. 423/422

Primary Examiner—Lorenzo B. Hayes
Attorney, Agent, or Firm—Robert L. Price; Harold H. Flanders

[57] ABSTRACT

Nitrocellulose coating compositions containing alkali metal alumino carbonates as flatting pigments.

2 Claims, No Drawings

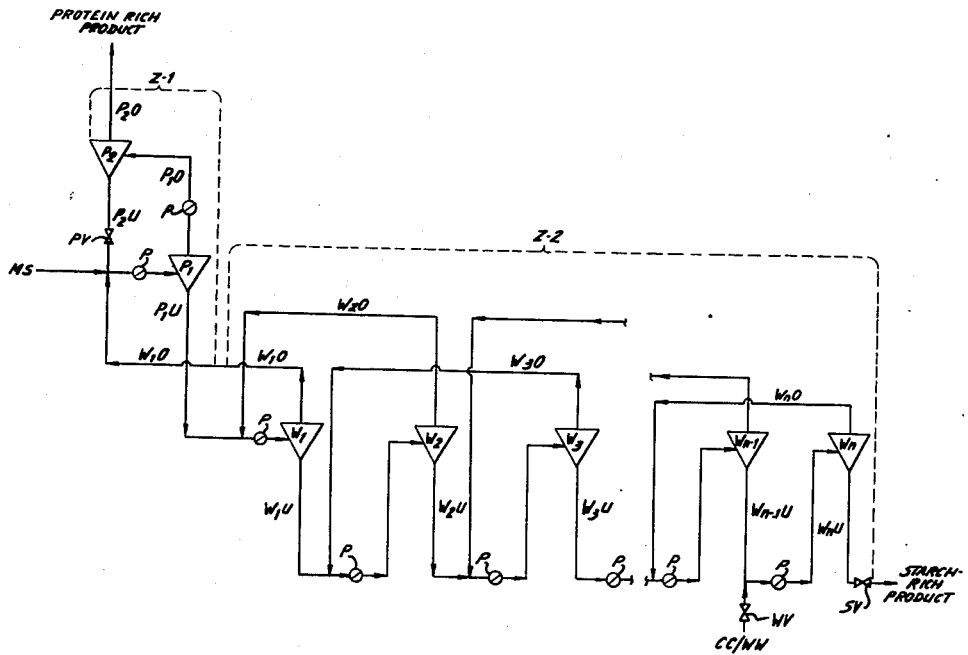

NITROCELLULOSE COATING COMPOSITION

This is a continuation of application Ser. No. 710,086, filed July 30, 1976, now abandoned.

BACKGROUND OF THE INVENTION

1. Field of the Invention

This invention relates to alkali metal alumino carbonates, their methods of preparation and areas of use, and more particularly, relates to novel amorphous and crystalline alkali metal alumino carbonate materials.

2. Description of the Prior Art

Crystalline sodium alumino carbonate is known to the prior art as the natural mineral Dawsonite. This crystalline product has the general structural formula as follows:

$$Na_2O:Al_2O_3:2CO_2:2H_2O$$

This material is a rare mineral which occurs naturally but has found limited utility.

U.S. Pat. No. 3,629,153 and corresponding French Pat. No. 1,573,310 relate to the preparation of alkalized alumina, which material is a solid absorbent prepared using Dawsonite as an intermediate material. The crystalline Dawsonite used in this patent is formed by the reaction of sodium aluminate with ammonium carbonate or carbon dioxide. The intermediate Dawsonite product is then heated at an elevated temperature to convert it to a granular alkalized alumina absorbent which is useful as an absorbent for gaseous materials.

A similar disclosure may be found in U.S. Pat. No. 2,992,884 which concerns a method for the removal of sulfur oxides from gases utilizing as the absorbent material an alumina product described as an alumina or chromium support having dispersed thereon an alkali metal oxide such as sodium oxide. This material is prepared by a reaction of an aluminum sulfate hydrate with sodium carbonate by adding an aqueous solution of the aluminum sulfate to an aqueous solution of the sodium carbonate at 90° C. The mixture is then stirred mechanically, allowed to settle and the supernatant liquid decanted. The product is then heated to 600° C. which reduces the carbon dioxide content.

A substantial amount of work has been carried out in the art for the preparation of alkali metal alumino silicates. Many of these materials are described as pigments or zeolites and have various particle sizes and other special properties. These materials are generally prepared by the reaction of alkali metal silicates and aluminum salts by mixing of the two solutions to form the precipitate. One basic patent in this area is U.S. Pat. No. 2,739,073 to Bertorelli, assigned to the Applicant's assignee, which discloses procedures for the preparation of finely divided alkali metal alumino silicates by the reaction of alkali metal silicates and aluminum salts.

To Applicant's knowledge however, there is no disclosure in the art for the preparation of amorphous alkali metal alumino carbonates or for the crystalline alkali metal alumino carbonates prepared in the manner described herein. Accordingly, the present invention concerns an advance in the art in the preparation of these products and in provision of a novel amorphous alkali metal alumino carbonate.

SUMMARY OF THE INVENTION

It is accordingly one object of this invention to provide a new method for the manufacture of alkali metal alumino carbonates.

A further object of the invention is to provide novel alkali metal alumino carbonates in their amorphous form.

A still further object of the invention is to provide methods for preparation of amorphous and crystalline alkali metal alumino carbonates by reaction of aluminum salts with an alkali metal carbonate or mixtures of an alkali metal carbonate and an alkali metal hydroxide.

A still further object of the invention is to provide novel areas of utility for the amorphous and crystalline alkali metal alumino carbonate products.

Other objects and advantages of the present invention will become apparent as the description thereof proceeds.

In satisfaction of the foregoing objects and advantages there is provided by this invention a novel class of amorphous alkali metal alumino carbonates which have the approximate general formula:

$$XM_2O:Al_2O_3:YCO_2:ZH_2O$$

where M is alkali metal, X is an integer ranging from 0.5 to 1.5, Y is an integer ranging from 0.5 to 2.0, and Z is an integer from 1 to 4. Also provided are novel processes for the preparation of amorphous and crystalline alkali metal alumino carbonates which comprise the reaction under carefully controlled conditions of an aluminum salt with an alkali metal carbonate or mixture of an alkali metal hydroxide and alkali metal carbonate. The present invention also provides areas of utility for the alkali metal alumino carbonates particularly in the areas of ion exchange, fire retardancy, foaming agents and as flatting pigments in varnishes and lacquers. A unique feature of the products is that they can serve dual functions in varnishes and lacquers as flatting agents and fire retardants.

DESCRIPTION OF THE SPECIFIC EMBODIMENTS

As indicated above, this invention is concerned with a group of products which can best be described as alkali metal alumino carbonates. They have the approximate general formula:

$$XM_2O:Al_2O_3:YCO_2:ZH_2O$$

wherein M is alkali metal, X is an integer ranging from about 0.5 to about 1.5, Y is an integer ranging from about 0.5 to about 2.0, and Z is an integer ranging from about 1 to about 4. M is an alkali metal, i.e., sodium, potassium or lithium, but is preferably sodium.

These materials can be prepared in their amorphous form or as crystalline products. The amorphous material is a new product not described heretofore in the art. The crystalline material has a crystal structure which is generally identical to the natural mineral Dawsonite. Both materials have useful properties since they decompose easily at high temperatures giving off water and evolving carbon dioxide. These properties make the products useful as fire retardants and extinguishers in paper, plastics, paint, lacquer and varnish, and as foaming agents. They also have useful ion exchange properties.

The most preferred products of this invention are those wherein X, Y and Z are as above and M is sodium, that is, the sodium alumino carbonates of the approximate formula:

$$XNa_2O:Al_2O_3:YCO_2:ZH_2O$$

As indicated the products of this invention find use in a number of areas particularly as absorbents and as flame retardants or extinguishers in paper, plastics, paints, lacquers, and varnishes. They are also useful as flatting agents in paints, lacquers and varnishes. A unique characteristic of the alumino carbonates is that they can serve simultaneously as fire retardants and flatting agents thus providing dual functions with one material. They may be used in clear varnishes and lacquers since the refractive indices of the products are about the same as the varnish or lacquer, i.e. about 1.5. These materials are also useful as absorbents as they show strong absorptive properties for organic materials in acid aqueous slurries. The gas absorption as well as liquid absorption properties also make them useful in pollution problems.

The materials are useful as flame retardants since at high temperatures they evolve carbon dioxide and have a higher LOI (Loss on Ignition) than sodium bicarbonate, a commercial fire extinguishing agent. Further the products do not cake at high relative humidities which is an advantageous feature of solid fire extinguishing materials. The crystalline materials are also useful as ion exchange agents, for example, in the removal of traces of transition metals from aqueous solutions.

The products of the present invention are prepared by the reaction of aluminum salts and alkali metal carbonates or mixtures of alkali metal carbonates and alkali metal hydroxides in aqueous solutions. While the same reactants are utilized in preparation of the products, the procedures are varied slightly in order to obtain either the amorphous product or the crystalline product as desired. In general, the process comprises the slow addition of an aqueous aluminum salt solution to an aqueous solution of an alkali metal carbonate or mixture of alkali metal carbonate and alkali metal hydroxide under certain conditions. The alkali metal carbonate solution is preferably a saturated solution containing an alkali metal carbonate such as sodium carbonate, sodium bicarbonate, potassium carbonate, potassium bicarbonate, and the like, in water. Sodium bicarbonate and sodium carbonate are especially preferred materials. While a saturated solution is preferred, aqueous solutions containing from 1 wt. % up to saturation may be used.

The aluminum salt solution is usually a solution of aluminum sulfate, preferably the commercial product alum. However, other aluminum salts can also be used including aluminum chloride, aluminum nitrate or the like. Aluminum sulfate however represents a highly preferred material since it provides excellent results, is readily available commercially and inexpensive. The aluminum salt solution should have a concentration from about 1% by weight up to the saturation point, and preferably about 10–25% by weight. It is also preferred for best results that the solution be clarified prior to use.

A unique and preferred feature of the present invention is the use of a mixture of an alkali metal hydroxide and alkali metal carbonate to react with the aluminum salt. The alkali metal hydroxide is preferably employed as about a 10–60 weight percent aqueous solution. NaOH is an especially preferred reactant utilized as a 50 wt. % aqueous solution. Use of the alkali metal hydroxide as a reactant in the process is advantageous as the reaction proceeds with the evolution of carbon dioxide and also provides a final product having an empirical formula closer to the theoretical formula. Moreover, the resulting alkali metal alumino carbonate is a better fire retardant as the loss on ignition (LOI) is increased, i.e., up to about 42% as compared to the product formed from alkali metal carbonate and the aluminum salt.

The reaction is carried out by charging the appropriate amount of the aqueous alkali metal carbonate solution and alkali metal hydroxide if used, to the reactor and subjecting to rapid agitation as by continuous stirring. The solution is then brought to the desired temperature, preferably in the range of about 50°–100° C., and most preferably in the range of about 60°–80° C. At this temperature and under the conditions of continuous agitation, the aluminum salt solution is then added to the carbonate solution until the pH of the total solution is in the range of 7.0 to 9.5. Preferably the addition is ceased when the pH reaches about 9.2. At this stage, the product has precipitated from solution and is then filtered, washed and dried as desired.

In conducting this reaction, one variation in the process which determines whether or not amorphous or crystalline products are obtained is based upon the speed of the addition of the aluminum salt solution to the alkali metal carbonate solution. Where a crystalline product is desired, the aluminum salt solution is added very slowly, e.g. dropwise, over a period of time in order to allow sufficient time for good crystal growth as the product precipitates from solution. On the other hand when producing the amorphous product, the aluminum salt solution can be added much more rapidly at the indicated temperatures.

An additional variation on the process which distinguishes between crystalline and amorphous products is that the process for production of the amorphous product requires a digestion or aging stage after the aluminum salt addition is completed. The digestion stage comprises heating the mixture at a temperature above the reaction temperature, e.g. about 20° to 40° C. above the reaction temperature and preferably at a temperature of about 80° to 100° C. The digestion stage is conducted for a time period of about 5 minutes up to about 5 hours. The aged product is much heavier than the product which is not subjected to digestion.

The reaction proceeds by reaction of the aluminum salt and other reactants to produce the final products together with by-products. In the basic reaction of the aluminum salt and alkali metal carbonate, as in the case of the preferred reaction of aluminum sulfate and sodium carbonate, about four moles of sodium carbonate react per mole of aluminum salt to produce one mole of the sodium alumino carbonate of the formula:

$$Na_2O:Al_2O_3:2CO_2:2H_2O$$

In this reaction, two moles of carbon dioxide are evolved and three moles of sodium sulfate are produced. In the reaction, the sodium alumino carbonate product precipitates from solution and is separated from the soluble sodium sulfate.

In the second aspect of the reaction using alkali metal hydroxide as a reactant, two moles of alkali metal carbonate and four moles of alkali metal hydroxide are reacted per mole of aluminum salt to provide one mole of the alkali metal carbonate product and three moles of alkali metal sulfate when aluminum sulfate is the reaction. Carbon dioxide is not evolved however in this reaction.

The crystalline products produced as a result of the present invention have been identified by X-ray diffraction as well as crystallized materials having a structural formula, which in the case of the sodium derivative, is the same as natural Dawsonite.

The amorphous product has been characterized with respect to its Loss on Ignition, the weight loss by drying, pour density, pack density, oil absorption, 10% slurry pH, surface area and thermal stability and has been found that the properties of the products actually prepared fall within the ranges given below. However, products in which these characteristics may be varied may also be prepared without departing from the scope of this invention.

| CHARACTERISTICS | RANGE |
| --- | --- |
| Weight loss by drying | 0.1–4.0% |
| Loss on ignition | 25–45% |
| Pour Density | 10–50 lb./cu. ft. |
| Pack Density | 25–70 lb./cu. ft. |
| Oil Absorption | 40–110 |
| 10% Slurry pH | 9.0–10.5 |
| Surface Area (m$^2$/g) | 30–110 |
| Thermal Stability | |
| Rather stable up to: | 200° C. |
| Rapid Decomposition above: | 300° C. |

The following examples are presented to illustrate the invention but it is not to be considered as limited thereto. In these examples and throughout, the specification parts are by weight unless otherwise indicated.

EXAMPLE 1

Crystalline Sodium Alumino Silicate 1.5 Liters of a saturated NaHCO$_3$ solution was stirred continuously at a temperature of 70° C. An aluminum sulfate solution containing 225 grams per liter and clarified, was then added dropwise until the pH of the solution reached 7.7. A total addition of 750 milliliters of the aluminum sulfate solution required four and one-half hours. On the completion of the reaction, the product had precipitated from solution and was then filtered and dried at 150° C. The yield was 51.4 grams. By analysis it was determined that the product had the following properties: 24.2% CO$_2$; 28.6% LOI; 28.5% Na$_2$O; 20.9% Al$_2$O$_3$. From this data the composition of the product was determined to be as follows:

$$0.8Na_2O:Al_2O_3:2CO_2:0.8H_2O + 0.35NaHCO_3 + 1.1Na_2SO_4$$

The material was identified by X-ray diffraction as well crystallized Dawsonite.

EXAMPLE 2

Amorphous Sodium Alumino Carbonate

A saturated solution of sodium bicarbonate in water which contained 350 grams of sodium bicarbonate in 3.78 liters of water in a total volume of 45.4 liters was maintained at a temperature of about 71° C. and an aluminum sulfate solution containing 906 grams per 3.78 liters of water was added to the bicarbonate solution at a rate of 500 milliliters per minute. The addition of the aluminum sulfate solution was continued at 71° C. until a pH of 7.0 had been reached at which time the addition was stopped. The resulting mixture was then digested for 10 minutes by heating at 93° C. and filtered immediately while hot. The filter cake was washed with less than up to 15 liters of water, dried at a temperature of 105° C. and milled.

The reaction yielded 1500 grams of product material. The theoretical yield was 84% based on aluminum sulfate consumption, and 80% based on sodium bicarbonate. By analysis, the product resulting from this example was found to be an amorphous product of the following formula:

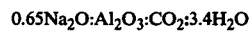

0.65Na$_2$O:Al$_2$O$_3$:CO$_2$:3.4H$_2$O

The product was found to exhibit the following characteristics:

| CHARACTERISTICS | RANGE |
| --- | --- |
| Weight loss by drying | 3% |
| LOI | 34.8% |
| Pour Density | 15 lb./cu. ft. |
| Pack Density | 26 lb./cu. ft. |
| Oil Absorption | 105 |
| 10% Slurry pH | 10.1 |
| Surface Area (m$^2$/g) | 104 |
| Thermal Stability | |
| Rather stable up to: | 200° C. |
| Rapid Decomposition above: | 200° C. |

EXAMPLE 3

Amorphous Sodium Alumino Carbonate

This example was carried out exactly the same as Example 2 with the exception that the digestion step was carried out for 4 hours at a temperature of 93° C. The resulting product provided the same general yield and the analysis indicated that it had the following structural formula:

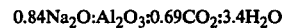

0.84Na$_2$O:Al$_2$O$_3$:0.69CO$_2$:3.4H$_2$O

The product was further characterized by the following properties:

| CHARACTERISTICS | RANGE |
| --- | --- |
| Weight loss by drying | 2.8% |
| LOI | 28% |
| Pour Density | 45 lb./cu. ft. |
| Pack Density | 68 lb./cu. ft. |
| Oil Absorption | 41 |
| 10% Slurry pH | 10.2 |
| Surface Area (m$^2$/g) | 79 |
| Thermal Stability | |
| Rather stable up to: | 250° C. |
| Rapid Decomposition above: | 300° C. |

EXAMPLE 4

This example illustrates use of a mixture of sodium carbonate and sodium hydroxide to react with the aluminum salt to form sodium alumino carbonate.

A caustic-soda ash solution of approximately 8 gallons was prepared containing 2 gallons of 50% NaOH, 4.42 pounds of Na$_2$CO$_3$ and 9.7 gallons of water. The resulting solution had a caustic concentration of 10.4% and a soda ash concentration of 13.7%.

Four gallons of this caustic soda ash solution was then charged to the reactor, heated to 71° C., and maintained at that temperature. Thereafter, an aluminum sulfate solution having a concentration of 2 pounds $Al_2(SO_4)_3$ per gallon of water was added to the mixture at a rate of about 0.5 gallon per minute. The addition was continued until the pH of the reaction mixture reached 9.2 at about 71° C. Thereafter, the remainder of the aluminum sulfate solution and caustic soda ash solution were added simultaneously at such rate as to maintain the pH at about 9.2 at 71° C. When a total of 16 gallons of aluminum sulfate solution had been added, the additions were discontinued and the mixture allowed to digest by heating at 71° C. for 10 minutes. The resulting mixture was then filtered, washed with water until free of sulfate and dried at 105° C. The resulting recovered product was sodium alumino silicate product having an LOI of 42.5%.

EXAMPLE 5

Flame Retardancy Properties

In this Example the amorphous product of Example 2 was tested for flame retardancy by tests involving use of a covered glass beaker of 1200 milliliters in which paper was burned. The ignition was done by touching the top one-fourth inch of the paper sample for one second with a two-inch colorless gas flame. The beaker was then covered immediately, the 3" × 4" paper sample, mounted vertically in a metal wire frame, was allowed to burn and glow. The time of flaming, glowing and percent weight loss were recorded in duplicate tests on paper which had been filled with 10%, 15% and 20% portions of sodium alumino carbonate and compared with the same amounts of antimony oxide as a comparison. The results of the tests were as follows:

| Type of Paper | Burning Time | Glow Time | Weight Loss |
|---|---|---|---|
| Unfilled | 21/26 Sec | 0/0 Sec | 39/37% |
| 10% $Sb_2O_3$ | 20/18 | 25/24 | 42/48 |
| 15% | 20/19 | 17/78 | 52/44 |
| 20% | 15/17 | 103/113 | 62/— |
| 10% SAC | 15/16 | 16/15 | 17/21 |
| 15% | 0/10 | 57/25 | 10/17 |
| 20% | 0/0 | 80/67 | 18/20 |

The conclusions which could be reached from these tests were that paper filled with 15 and 20% of sodium alumino carbonate does not catch fire as easily as other samples. Papers with more of the sodium alumino carbonate filler glow longer than or as long as paper heavily filled with titanium dioxide or unfilled. Weight losses as a result of burning are higher in antimony oxide filled paper than in the sodium alumino carbonate filled paper.

EXAMPLE 6

In this example, the amorphous pigment recovered from Example 4 was tested for dispersion and flatting characteristics in a standard paint procedure. The testing procedure was as follows:

DISPERSION & FLATTING CHARACTERISTICS IN A TRANSPARENT SPECIFICATION NITROCELLULOSE LACQUER

Equipment

Hamilton-Beach #30 Drink Master
34 Coatings Application Rod
Gloss Meter, 60° and 85° Heads
Black Carrara Glass Plates

Materials

MIL-L-10287A Amend. 2, Type II Lacquer
Sodium Alumino Carbonate of Example 4
Methyl Isobutyl Ketone

Procedure

1. Strain through a cone filter a lacquer solution conforming to Military Specification MIL-L-10287A-amendment 2, type II, of issue Aug. 27, 1959. Weigh the appropriate amount into a milkshake cup. Weigh the pigment into the lacquer. Under spatula mixing incorporate the pigment into the pre-weighed amount of lacquer solution until wet in.
   Lacquer Solution: 420.0 grams
   Sodium Alumino Carbonate Pigment: 12.0 grams
   Mix 1 min.
   Then add methyl Isobutyl Ketone: 5.0 cc
   Mix 3 min.
   Total mixing time — 4 min.
This amount of pigment is equivalent to 10% weight of vehicle solids.

2. Place milkshake cup containing pigment-lacquer mixture under the Hamilton-Beach #30 drink master. Using the low speed setting, agitate for one minute. Remove milkshake cup. Scrape all loose dry pigment into the lacquer, also rinse down any remaining particles with 5 cc methyl isobutyl ketone. Replace on the Hamilton-Beach for three (3) additional minutes. Then determine Hegman fineness of grind (PT-6.100) for compliance with a minimum reading of 5.5 and cleanliness (no specks) above the grind line.

3. Drawdown in a Constant Temperature and Humidity Room the transparent lacquer as listed under 2, using a #34 wire wound coatings application rod. Let dry at room temperature for 45 minutes under dust free conditions in a vertical position with minimum air currents.

4. Using a Gardner multi-angle gloss meter, determine the glosses of the drawdown (60° head) as well as the sheen of the same drawdown (85° head).

5. In order for pigment material to pass the requirements, the gloss and sheen measurements must be in conformance with the following specifications:

|  | 60° Gloss | 85° Sheen |
|---|---|---|
| at 10.00% pigment | <15 | <45 |
| 3.50% | <45 | <75 |
| 1.75% | <55 | <85 |

In addition to the above criteria, the drawdowns must be applied in a way to minimize foreign particle dust from the dried panel. The application area should be located far from the mixing, weighing and dispersion, also away from air vents and windows.

The results of the tests were as follows:

| Material | 60° Gloss | 85° Sheen | Hegman |
|---|---|---|---|
| Sodium Alumino Carbonate-Example 4 (10% pigment) | 13 | 21 | 5.5 |

The invention has been described herein by reference to certain preferred embodiments; however, as obvious variations thereon will become apparent to those skilled in the art from the teachings of this specification, the invention is not to be limited thereto.

What is claimed is:

1. In a coating composition comprising nitrocellulose, a solvent therefor and a pigmentary flatting agent; the improvement comprising, as said agent, an amorphous alkali metal aluminocarbonate of the following general structure:

$$XM_2O:Al_2O_3:YCO_2:ZH_2O$$

wherein M is an alkali metal, X is an integer ranging from about 0.5 to 1.0, Y is an integer ranging from about 0.5 to 2.0, and Z is an integer ranging from about 1 to 4; said aluminocarbonate being present in an amount sufficient to exert flatting properties to said composition.

2. The coating composition of claim 1 wherein said amount of aluminocarbonate is equivalent to 10% weight of vehicle solids.

* * * * *